US006658434B1

(12) United States Patent
Watanabe et al.

(10) Patent No.: US 6,658,434 B1
(45) Date of Patent: Dec. 2, 2003

(54) METHOD OF AND A SYSTEM FOR RECOVERING DATA IN AN INFORMATION PROCESSING SYSTEM

(75) Inventors: Haruaki Watanabe, Isehara (JP); Kenji Yamagami, Los Gatos, CA (US); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 289 days.

(21) Appl. No.: 09/639,755

(22) Filed: Aug. 15, 2000

(30) Foreign Application Priority Data

Feb. 2, 2000 (JP) .......................... 2000-030217

(51) Int. Cl.[7] .............................................. G06F 12/00
(52) U.S. Cl. ....................... 707/202; 707/200; 707/201; 707/204
(58) Field of Search ................................ 707/200–206

(56) References Cited

U.S. PATENT DOCUMENTS

| | | | | | |
|---|---|---|---|---|---|
| 4,771,375 A | * | 9/1988 | Beglin et al. | ................ | 711/111 |
| 5,065,311 A | * | 11/1991 | Masai et al. | ................... | 714/20 |
| 5,564,047 A | * | 10/1996 | Bloem et al. | ............... | 707/100 |
| 5,644,696 A | * | 7/1997 | Pearson et al. | ................ | 714/6 |
| 5,680,602 A | * | 10/1997 | Bloem et al. | .................. | 707/1 |
| 5,926,819 A | * | 7/1999 | Doo et al. | ................... | 707/100 |
| 6,154,852 A | * | 11/2000 | Amundson et al. | ............ | 714/5 |
| 6,269,431 B1 | * | 7/2001 | Dunham | ..................... | 711/162 |
| 6,349,357 B1 | * | 2/2002 | Chong, Jr. | .................. | 711/111 |
| 6,353,878 B1 | * | 3/2002 | Dunham | ..................... | 711/162 |

* cited by examiner

Primary Examiner—Greta Robinson
Assistant Examiner—Linh Black
(74) Attorney, Agent, or Firm—Mattingly, Stanger & Malur, P.C.

(57) ABSTRACT

In an information processing system including a central processor for generating commands to process storage data stored and for executing a sequence processing and a storage subsystem including a plurality of storage media for transferring data between the plural storage media according to commands from the central processor, a data recovery method recovers data to a predetermined state upon occurrence of a failure in a sequence of processing executed by the central processor. Before execution of a sequence of processing, the central processor issues to the storage subsystem a saving request to save in the plural storage media a copy of data stored in either one of the storage media used in the sequence of processing. In response to the saving request, the storage subsystem saves a copy of data of the storage media.

12 Claims, 16 Drawing Sheets

PROCESSING OF DISK SUBSYSTEM 109

HOST 101 SIDE PROCESSING

PROCESSING OF DISK SUBSYSTEM 1509

NOT IN PAIR

PAIR IN CREATION

PAIR CREATION COMPLETED

PAIR DIVISION

PAIR IN RECOVERY

METHOD OF AND A SYSTEM FOR RECOVERING DATA IN AN INFORMATION PROCESSING SYSTEM

BACKGROUND OF THE INVENTION

The present invention relates to an information processing system to execute online processing and batch processing, and in particular, to a method of recovering data stored on a storage media such as a storage, for example, a disk when destroyed by a failure or the like of online processing and/or batch processing.

In online processing and batch processing executed in an information processing system of a bank, a securities company, or the like, when the processing is abnormally terminated by a bug of a program, a failure of a storage, or the like, integrity of data may be lost depending on cases. Important data may be destroyed or erased by a mistake made by a human working in the information processing system.

There have been known several techniques which restore the information processing system in such a failed state and which solve conflict of data integrity to restart the processing interrupted or to execute again the processing interrupted. One of such recovery technique uses "backup and restoration".

In the recovery of "backup and restoration", for example, when the recovery is applied to a database system, a backup of data is periodically stored on a recording media such as a magnetic tape. At occurrence of a failure in the system, the backup on the magnetic tape is restored in the storage to recover the data of the storage up to an appropriate point using a log file. The database data is resultantly recovered to an appropriate state and the database processing can be restarted.

In batch processing system, data is stored as backup data on a magnetic tape before batch processing is started. When the processing is thereafter abnormally terminated, the backup data is read from the magnetic tape to restore data of the storage to a state before the start of batch processing. The batch processing is then re-executed beginning at its start point.

When data is restored in the recovery of "backup and restoration" of the prior art, data in the areas on the magnetic tape not updated from when the backup data is stored (data in the areas whose data matches that stored in the storage) is also read from the magnetic tape and is written in the storage. This data transfer is actually unnecessary and elongates the period of time required for the restoration (reference is to be made to FIG. 17A).

In a case in which areas A, B, and C are specified as a backup and restoration unit in the storage, when each area thereof is individually accessed and hence only area A is required to be recovered, the restoration is carried out for areas A to C. This also elongates the restoration time. During the data restoration, processing which uses data in areas A to C must be interrupted. This adversely influences efficiency of the overall processing (reference is to be made to FIG. 17B).

SUMMARY OF THE INVENTION

It is therefore an object of the present invention to provide a data recovery method, which solves the problems of the prior art, to increase the data restoring speed using the backup data to thereby minimize the period of time required to restore the system from to a normal state.

To achieve the object above in accordance with the present invention, in an information processing system including a central processor and a storage subsystem including a storage media such as a disk to execute a data transfer in response to a request from the central processor, before data on the disk is updated by a sequence of processing, the information processor issues to the storage subsystem a saving request to save a copy of data stored on a storage media such as a disk used in the sequence of processing. In response to the saving request, the storage subsystem saves a copy of data on the storage media. When the contents of the storage media is updated in a sequence of processing by the central processor, the storage subsystem stores differential information including an area updated. When it is necessary to restore the contents of the storage media to a state of a particular point of time, the storage subsystem restores, in response to a data restoring request from the central processor, the saved data on the storage media according to the differential information stored.

According to one aspect of the present invention, in an information processing system including a central processor and a storage subsystem including a storage media such as a disk to execute a data transfer in response to a request from the central processor, the storage subsystem restores, in response to a restoring request from the central processor, backup data of data, which is kept on a first storage media storing data of a logic volume to be accessed by the central processor, on a second storage media. The storage subsystem establishes, in response to a swap request from the central processor, a relationship between the logic volume and the second storage media. Thereafter, in response to an access request to the logic volume from the central processor, the storage subsystem accesses data in the second storage media.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Figure 1:
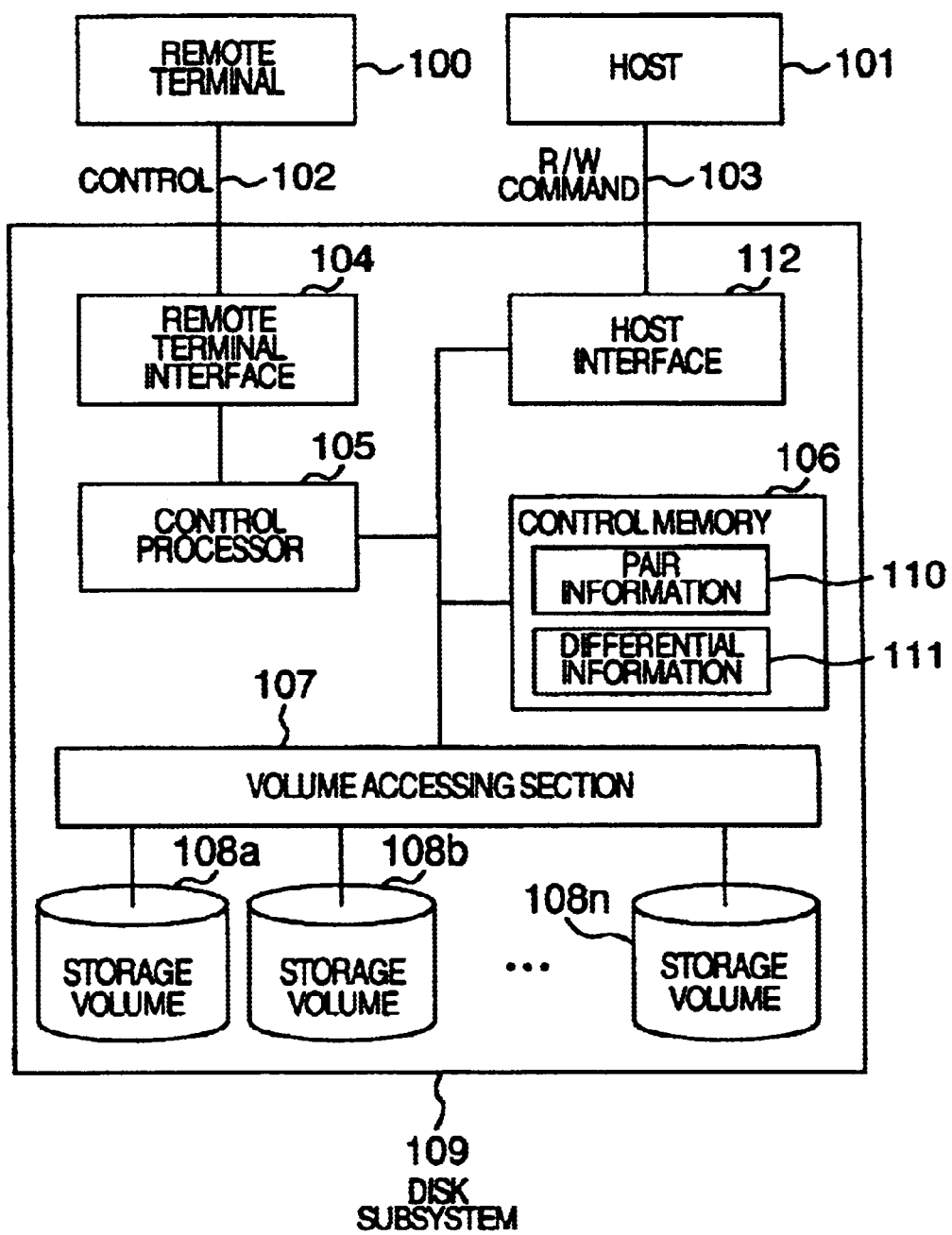
FIG. 1 is a block diagram showing a system configuration of an embodiment of an information system according to the present invention.

FIG. 1 shows in a block diagram a system configuration of a first embodiment of an information processing system according to the present invention. This system includes a host computer or host 101 to issue commands such as a read/write (R/W) command and a disk subsystem 109. Disk subsystem 109 is connected to host 101 via an interface bus 103 such as a small computer system interface (SCSI) and a fiber channel.

Between host 101 and disk subsystem 109, information is communicated using an SCSI protocol and a Fibre protocol.

Disk subsystem 109 includes a host interface 112, a control processor 105, a control memory 106, a volume accessing section 107, and volumes 108a to 108n. Host interface 112 is an interface for host 101. Control processor 105 controls disk subsystem 109 according to a request which is sent from host 101 and which is received by host interface 112. Control memory 106 is a memory to store control information necessary for control processor 105 to control disk subsystem 109. As information concerning the present invention, pair information 110 and differential information 111 are kept in control memory 106. Volume accessing section 107 has a function to read data from and to write data in volumes 108a to 108n. Volumes 108a to 108n include a disk unit including a magnetic disk media to store data and are assigned with identifiers, respectively.

Figure 2:
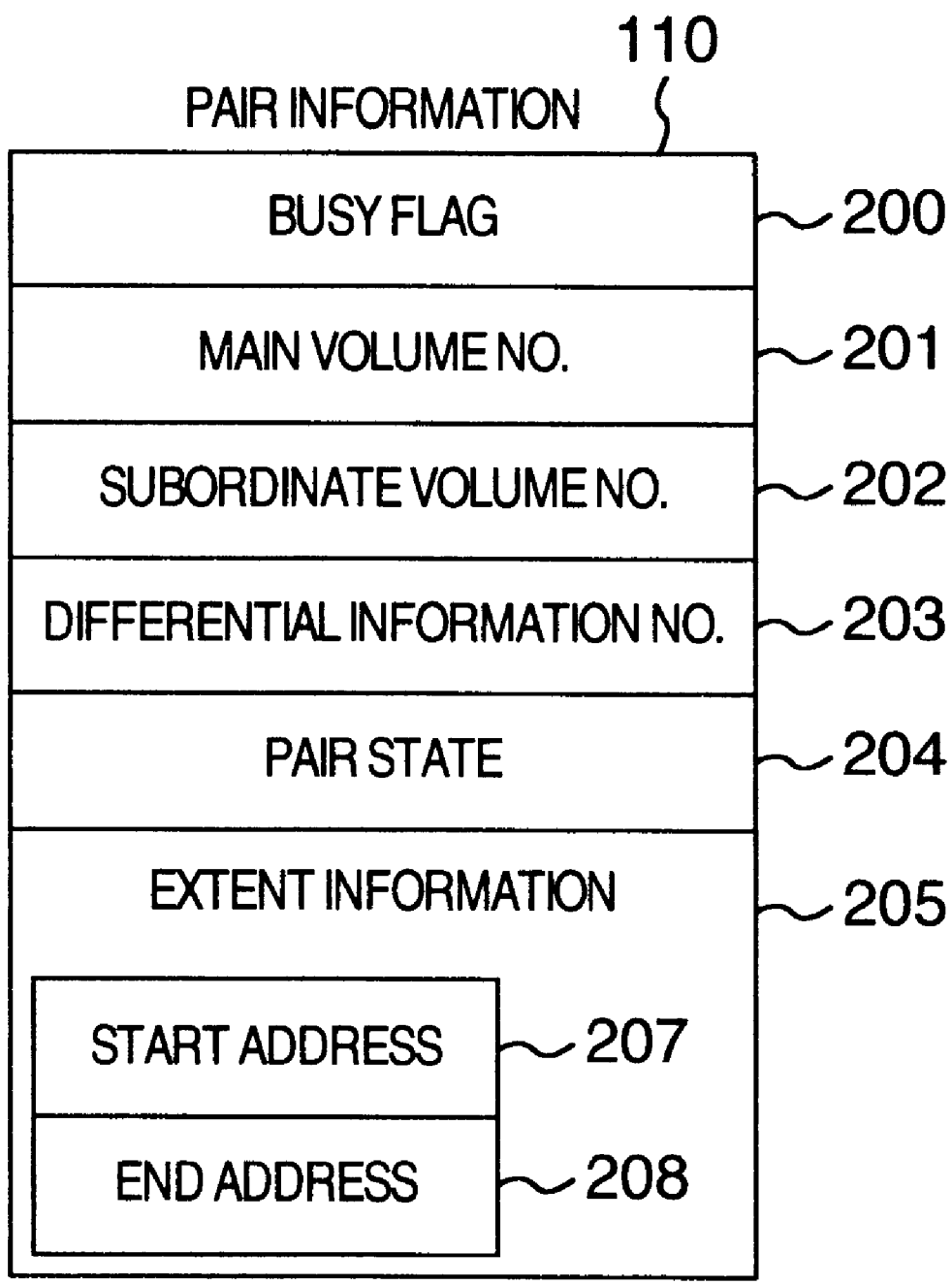
FIG. 2 is a diagram showing a data layout as an example of pair information 110.

Control memory 106 keeps at least one pair information item 110. FIG. 2 shows an example of a data layout of pair information 110.

Pair information 110 includes a busy flag 200, a main volume number 201, a subordinate volume number 202, a differential information number 203, a pair state 204, and extent information 205.

Busy flag 200 is a flag to indicate whether or not pertinent pair information 110 is in use. Busy flag 200 takes a value of "busy" or "not busy". When busy flag 200 is busy, pertinent pair information 110 is being used. When busy flag 200 is not busy, pertinent pair information 110 is not in use, i.e., available.

Main and subordinate volume numbers 201 and 202 are identifiers to identify volumes 108. A volume identified by main volume number 201 is referred to as a main volume and a volume identified by subordinate volume number 202 is referred to as a subordinate volume herebelow. Differential information number 203 is an identifier to identify differential information 111. A set of a main volume and a subordinate volume is called "a pair" in this description. A pair is in a state "pair in creation", "pair creation completed", "pair division", "data in recovery", or "not in pair". Pair state 204 indicates such a state of a pair.

Referring to examples shown in FIGS. 18A to 18E, description will be given of states of a pair of the main and subordinate volumes. This example includes a main volume 108a and a subordinate volume 108b.

Figure 18A:
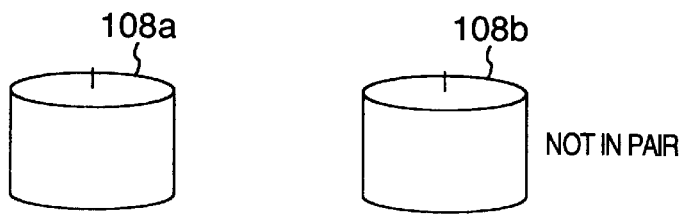
FIGS. 18A to 18E are diagrams showing examples of pair states of pair information.

In FIG. 18A, data has not been copied between the main and subordinate volumes. Data stored in the main volume is not related to that stored in the subordinate volume, namely, this pair is in a state of "not in pair".

Figure 18B:
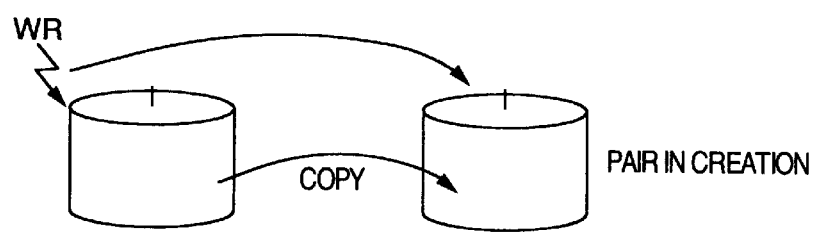

In FIG. 18B, data of the main volume is started to be copied onto the subordinate volume and read/write data is also copied from the main volume to the subordinate volume. This is a state of "pair in creation".

Figure 18C:
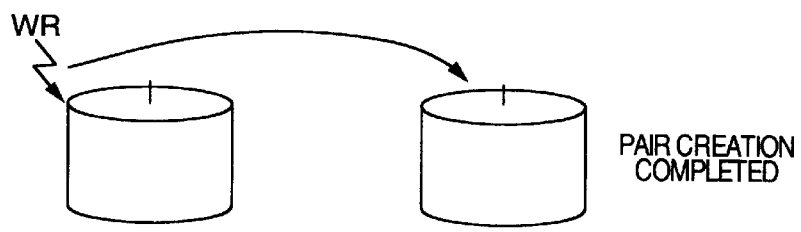

In FIG. 18C, all data of the main volume has been completely copied onto the subordinate volume.

This indicates a state of "pair creation completed".

Figure 18D:
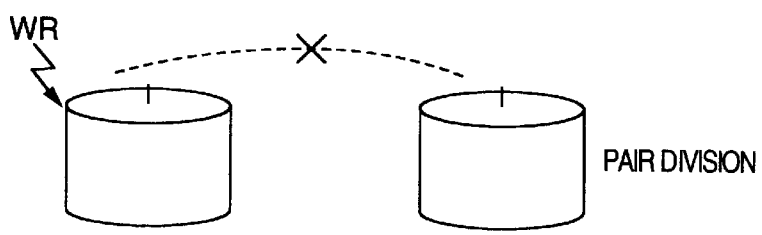

In FIG. 18D, the mutual relationship between the main volume and the subordinate volume is interrupted. This state is "pair division".

Figure 18E:
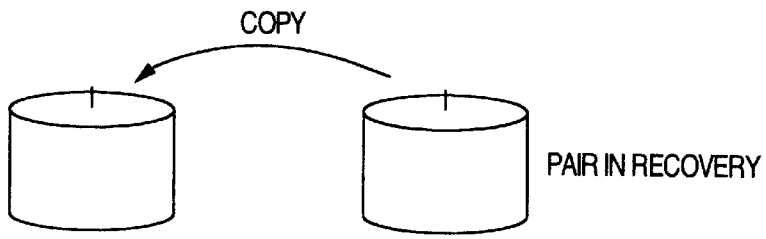

In FIG. 18E, the data copy is executed from the subordinate volume onto the main volume. This indicates a state of "data in recovery".

Extent information 205 includes a start address 207 and an end address 208. Start address 207 indicates a start address of a continuous area in volumes 108a to 108n. End address 208 indicates an end address of a continuous copy area in volumes 108a to 108n. For example, when volumes 108a to 108n are fixed-length block volumes including fixed-length blocks, start and end addresses 207 and 208 store block numbers, respectively. When volumes 108a to 108n are variable-length record volumes including variable-length records, start and end addresses 207 and 208 store track numbers, respectively. For easy understanding of explanation, an area to store data is indicated by a track. Therefore, a track may be a track of a variable-length record volume or a track of a fixed-length block volume. In volume 108, an i-th track relative to a start position of volume 108 is represented as track (i).

Figure 3:
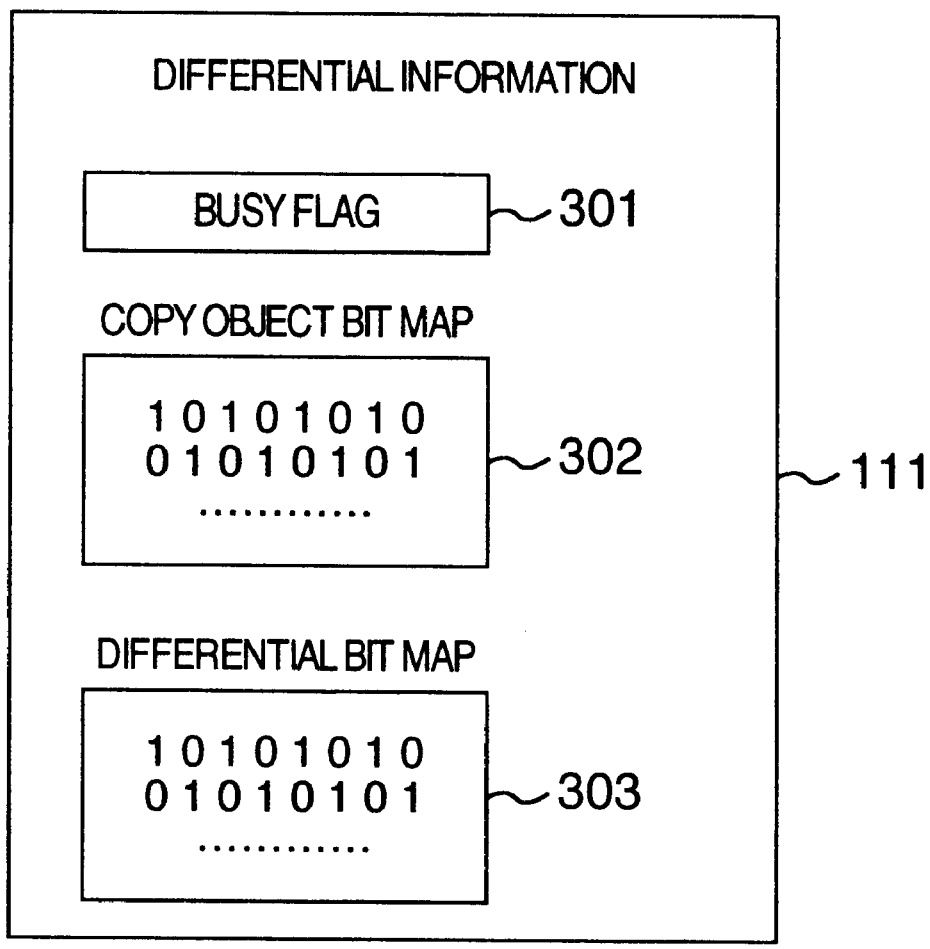
FIG. 3 is a diagram showing a data layout as an example of differential information 111.

Control memory 106 keeps at least one differential information item 111. FIG. 3 shows an example of a data layout of differential information 111.

Differential information 111 includes a busy flag 301, a copy object bit map 302, and a differential bit map 303. Busy flag 301 is a flag to indicate whether or not pertinent differential information 111 is being used. Busy flag 301 takes a value of "busy" or "not busy". When busy flag 301 is "busy", pertinent differential information 111 is being used. When busy flag 301 is "not busy", pertinent differential information 111 is not in use or available.

Copy object bit map 302 is information indicating data to be copied from a subordinate volume onto a main volume and includes a plurality of bits. One bit corresponds to one track on volume 108. When a bit is "0", a track or block corresponding to the bit is not a copy object. When a bit is "1", a track or block corresponding to the bit is a copy object. In copy object bit map 302, an i-th bit is expressed as copy object (i) herebelow. That is, a bit corresponding to track (i) is copy object (i).

Differential bit map 303 is information to indicate a track whose data differs between the main and subordinate volumes. Map 303 includes a plurality of bits. As in copy object bit map 302, one bit corresponds to one track. If a bit is "0", data of a track corresponding to the bit is identical for the main and subordinate volumes. If a bit is "1", data of a track corresponding to the bit varies between the main and subordinate volumes. In differential bit map 303, an i-th bit is expressed as differential (i) herebelow.

That is, a bit corresponding to track (i) is differential (i).

Figure 4:
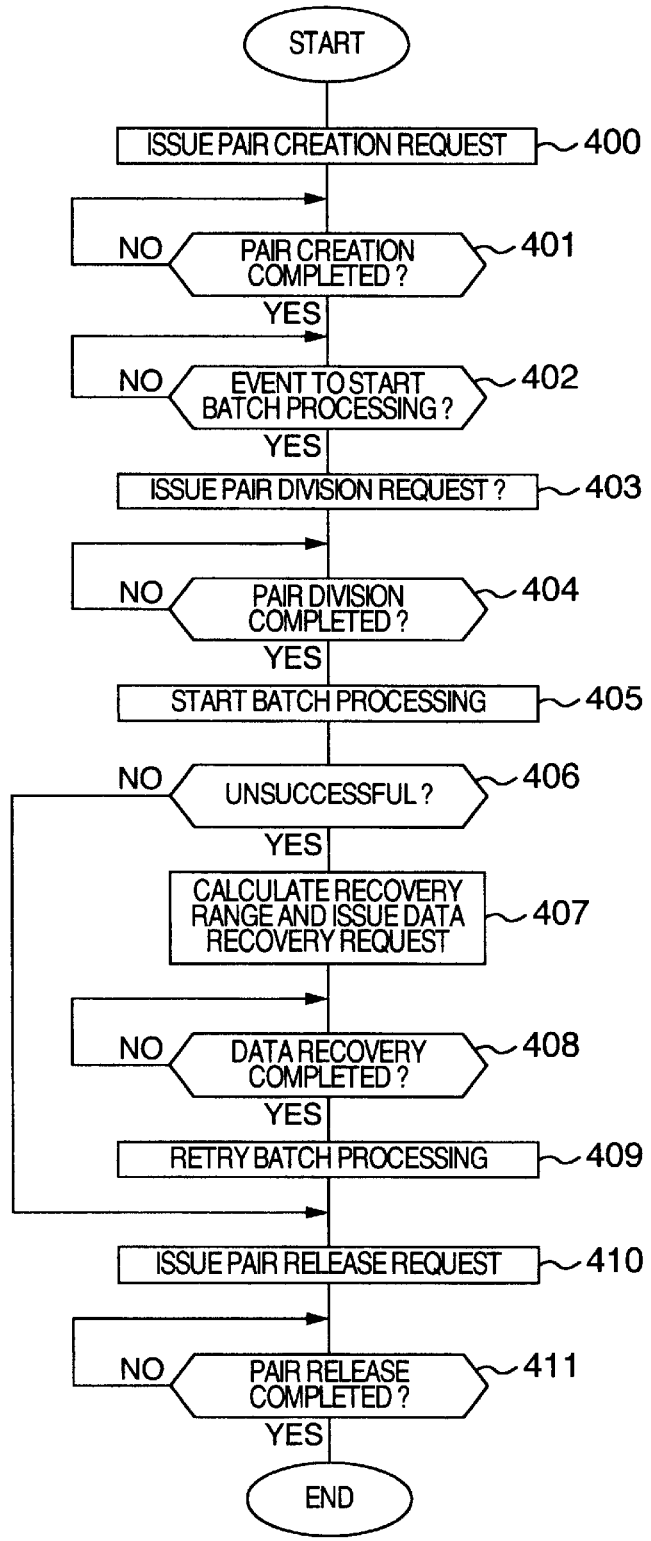
FIG. 4 is a flowchart showing a flow of processing executed by a host 101 to execute batch processing.

FIG. 4 shows in a flowchart a flow of processing executed by host 101 to execute batch processing.

Assume that volumes 108a to 108n storing data for batch processing to be executed have identifiers (to be represented as S herebelow) and volumes 108a to 108n not used have identifiers (to be expressed as T herebelow), and the identifiers S and T indicate the main and subordinate volume numbers, respectively. Host 101 generates a pair creation request using, as parameters, S for main volumes 108a to 108n and T for subordinate volumes 108a to 108n and issues the request to disk subsystem 109 (step 400).

After the issuance of the pair creation request, host 101 generates a pair state referring request including, as parameters, main volume number S and subordinate volume number T and issues the request to disk subsystem 109. In response thereto, if disk subsystem 109 sends a pair state of "pair creation completed", processing goes to step 402. If disk subsystem 109 sends other than "pair creation completed", processing waits for "pair creation completed" (step 401).

When the pair state becomes "pair creation completed", host waits, for example, an event to start batch processing, for example, a point of interruption of online processing (step 402).

At an event to start batch processing, host creates a pair division request including, as parameters, main volume number S and subordinate volume number T and issues the request to disk subsystem 109 (step 403).

After the issuance of the pair division request, host 101 generates a pair state referring request including, as parameters, main volume number S and subordinate volume number T and issues the request to disk subsystem 109. In response to the request, if disk subsystem sends a pair state of "pair division", control is passed to step 405. If disk subsystem 109 sends other than "pair division", host 101 waits for "pair division" (step 404).

When "pair division" is received, host 101 starts batch processing (step 405).

If the batch processing is abnormally terminated, data before the execution of batch processing is necessary to retry execution of the batch processing. Processing goes to step 407. If the batch processing is normally terminated, control is transferred to step 410 (step 406).

When data before the execution of the batch processing is required because of an abnormal termination thereof, host 101 searches volumes 108a to 108n for an area to recover data. Host 101 analyzes a log file stored in either one of volumes 108a to 108n to identify an area updated during the execution of the batch processing abnormally terminated. Alternatively, host 101 may receive a specification for the data recovery from the user. Assume that an area resultantly attained has a start address "B" and an end address "E".

Host 101 then generates a data recovery request including, as parameters, S as a value of main volume number, T as a value of subordinate volume number, B as a value of a start address, and E as a value of an end address and sends the request to disk subsystem 109 (step 407).

After issuance of the data recovery request, host 101 creates a pair state referring request including, as parameters, main volume number S and subordinate volume number T and issues the request to disk subsystem 109. In response thereto, if disk subsystem 109 sends a pair state of "pair division", processing goes to step 409. If disk subsystem 109 sends other than "pair division", processing waits for "pair division" (step 408).

When the pair state becomes "pair division", host 101 executes again the batch processing (step 409).

When the batch processing is normally terminated, host 101 generates a pair release request including, as parameters, main volume number S and subordinate volume number T and issues the request to disk subsystem 109 (step 410).

After having issued the pair release request, host 101 creates a pair state referring request including, as parameters, main volume number S and subordinate volume number T and issues the request to disk subsystem 109. In response thereto, if disk subsystem 109 sends a pair state of "not in pair", the processing is terminated. If disk subsystem 109 sends other than "not in pair", processing waits for "not in pair" (step 411).

In the processing on host 101 above, data is first recovered to a state before the execution of batch processing and then the batch processing is executed again. However, it is also possible that data is updated to an appropriate point using a log file in step 409 so as to thereafter execute the batch processing.

Figure 5:
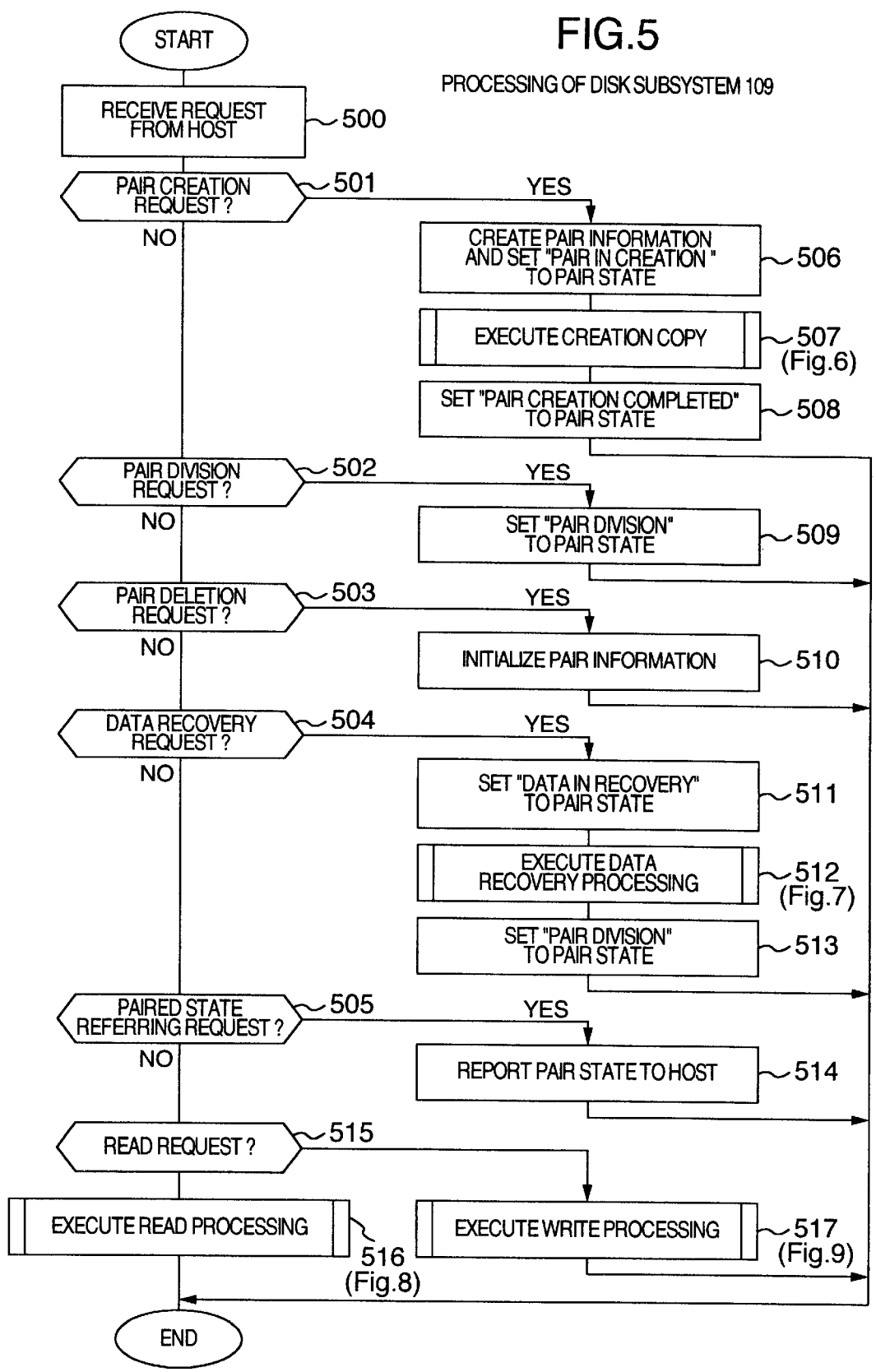
FIG. 5 is a flowchart showing a flow of processing executed by a disk subsystem 109 in response to a request from host 101.

FIG. 5 shows in a flowchart a flow of processing executed by disk subsystem 109 in response to a request from host 101.

Having received a request from host 101, disk subsystem 109 determines, in steps 500 to 505, that the request indicates a pair creation request, a pair deletion request, a data recovery request, or a pair state referring request.

If the request from host 101 is a pair creation request, disk subsystem 109 generates pair information and differential information. Specifically, disk subsystem 109 selects pair information 110 for which busy flag 200 is "not busy" and sets busy flag 200 of selected pair information 110 to "busy". Disk subsystem 109 then selects differential information 111 for which busy flag 301 is "not busy" and sets busy flag 301 of selected differential information 111 to "busy".

Thereafter, disk subsystem 109 sets main volume number S and subordinate volume number T specified as parameters in the pair creation request respectively to main volume number 201 and subordinate volume number 202 of selected pair information 110. Disk subsystem 109 sets an identifier of selected differential information 111 to differential information number 203 of selected pair information 110. Disk subsystem 109 sets "pair in creation" to pair state 204 of pertinent pair information 110. Disk subsystem 109 then set all bits of copy object bit map 302 and differential bit map 303 of selected differential information 111 to zero (step 506).

Having set pair information 110 and differential information 111, disk subsystem 109 executes creation copy processing (step 507).

After the creation copy is completed, disk subsystem 109 sets "pair creation completed" to pair state 204 of pertinent pair information 110 selected in step 506 (step 508).

If a request received from host 101 is a pair division request, disk subsystem 109 selects pair information 110 for which busy flag 200 is "busy" and main volume number S and subordinate volume number T specified as parameters in the pair division request are set respectively to main volume number 201 and subordinate volume number 202. Disk subsystem 109 sets "pair division" to pair state 204 of selected pair information 110 and terminates processing (step 509).

If a request received from host 101 is a pair deletion request, disk subsystem 109 selects pair information 110 for which busy flag 200 is "busy" and main volume number S and subordinate volume number T specified as parameters in the pair deletion request are set respectively to main volume number 201 and subordinate volume number 202. Disk subsystem 109 sets "not busy" to busy flag 301 of differential information 111 indicated by differential information number 203 of selected pair information 110. Disk subsystem 109 further sets "not busy" to busy flag 200 of selected pair information 110. After having updated busy flags 200 and 301, disk subsystem 109 terminates processing (step 510).

If a request received from host 101 is a data recovery request, disk subsystem 109 selects pair information 110 for which busy flag 200 is "busy" and main volume number S and subordinate volume number T specified as parameters in the data recovery request are respectively set to main volume number 201 and subordinate volume number 202. Disk subsystem 109 sets "data in recovery" to pair state 204 of selected pair information 110. Disk subsystem 109 further sets start address B and end address E set as parameters in the data recovery request to start address 207 and end address 208 of extent information 205 of selected pair information 110. Disk subsystem 109 sets copy object bit map 302 of differential information 111 pointed by differential information number 203 of selected pair information 110. That is, for each bit ranging from difference (B) to difference (E), "0" is set to copy object (i) when difference (i) is "0" and "1" is set to copy object (i) when difference (i) is "1" (step 511).

After updating pair information 110 and differential information 111, disk subsystem 109 executes data recovery processing, which will be described later (step 512).

When the data recovery processing is completed, disk subsystem 109 sets "pair division" to pair information 110 selected in step 511 and terminates processing (step 513).

If a request received from host 101 is a pair state referring request, disk subsystem 109 selects pair information 110 for which busy flag 200 is "busy" and main volume number S and subordinate volume number T specified as parameters in the pair state referring request are set respectively to main volume number 201 and subordinate volume number 202. Disk subsystem 109 reports pair state 204 of selected pair information 110 to host 101 and terminates processing. If pertinent pair information 110 is absent, a pair state of "not in pair" is reported (step 514).

If a request from host 101 is none of the requests above, disk subsystem 109 determines whether or not the request is a read or write request. If the request is a read request, control is passed to read processing, which will be described later (step 516).

If the request is a write request, control is passed to write processing, which will be described later (step 517).

Figure 6:
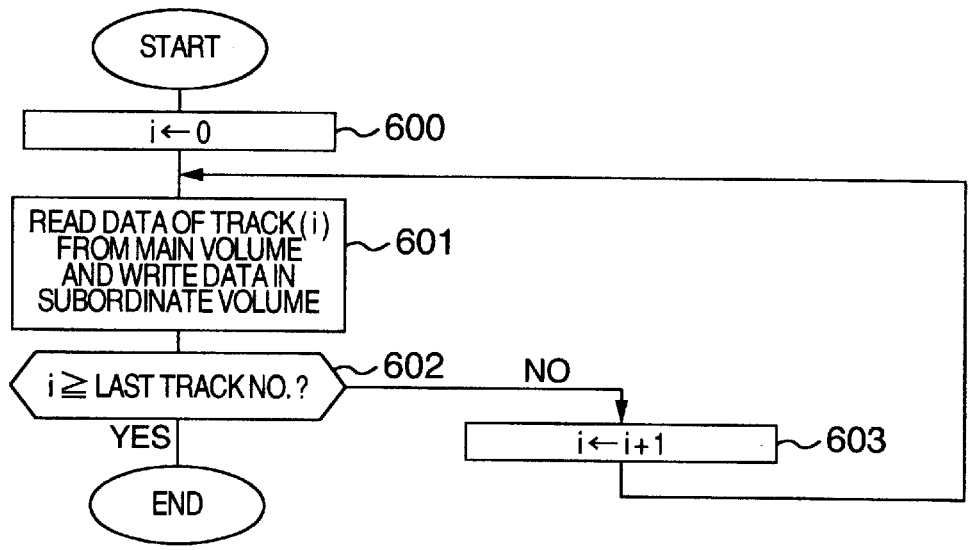
FIG. 6 is a flowchart showing a flow of creation copy processing executed in step 507.

FIG. 6 shows in a flowchart a flow of creation copy processing executed in step 507.

Disk subsystem 109 initializes variable i to "0" (step 600).

Disk subsystem 109 reads by volume accessing section 107 data from track (i) of volume 108 specified by an identifier set to main volume number 201 of pair information 110 selected in step 506. Disk subsystem 109 then writes by volume accessing section 107 the data in track (i) of volume 108 specified by an identifier set to subordinate volume number 202 of pair information 110 (step 601).

Disk subsystem 109 determines whether or not variable i has a value exceeding the track number of the last track of the main volume (step 602). If variable i exceeds the track number, disk subsystem 109 terminates the creation copy processing and proceeds to step 508. Otherwise, disk subsystem 109 goes to step 603. Disk subsystem adds "one" to variable i and returns to step 601 to execute copy processing of a subsequent track (step 603).

Figure 7:
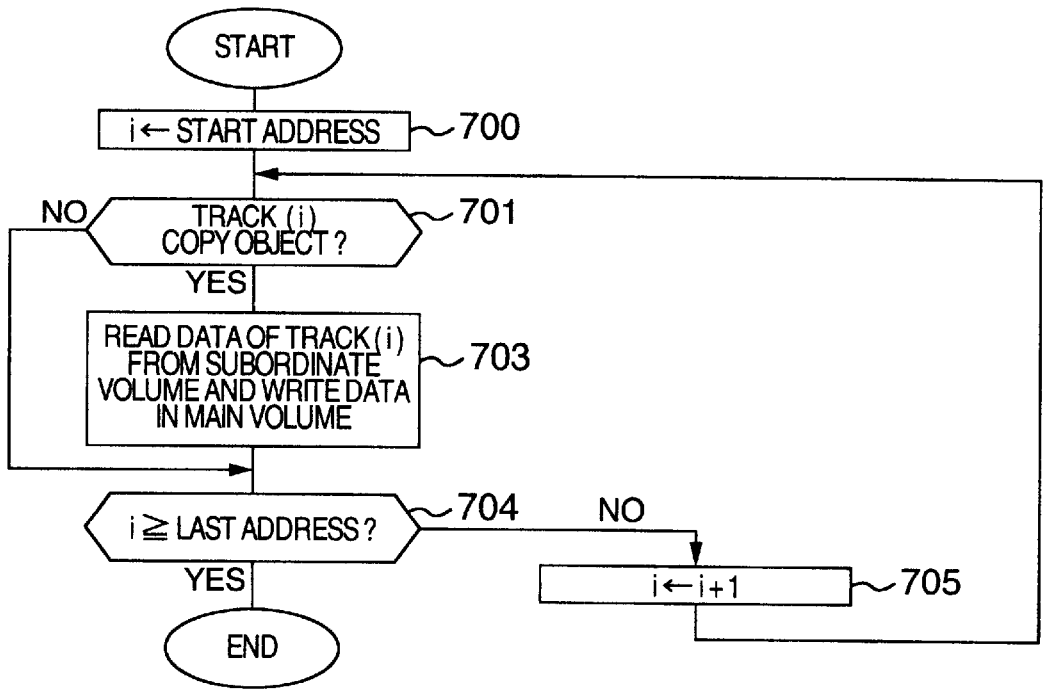
FIG. 7 is a flowchart showing a flow of data recovery processing executed in step 512.

FIG. 7 shows in a flowchart a flow of data recovery processing conducted in step 512.

Disk subsystem 109 sets an initial value of B to variable i (step 700).

Disk subsystem 109 refers to copy object bit map 302 set in step 511 to determine whether copy object (i) is "0" or "1" (step 701). If copy object (i) is "0", processing proceeds to step 704; otherwise, processing goes to step 703.

In step 703, disk subsystem 109 reads by volume accessing section 107 data from track (i) of the subordinate volume and writes the data in track (i) of the main volume and sets copy object (i) to "0".

In step 704, disk subsystem 109 compares E with variable i. If i is equal to or more than E, disk subsystem 109 terminates the data recovery processing. Otherwise, disk subsystem 109 goes to step 705. In step 705, disk subsystem 109 adds "one" to variable i and returns to step 701 to execute the similar processing for a succeeding track.

Figure 8:
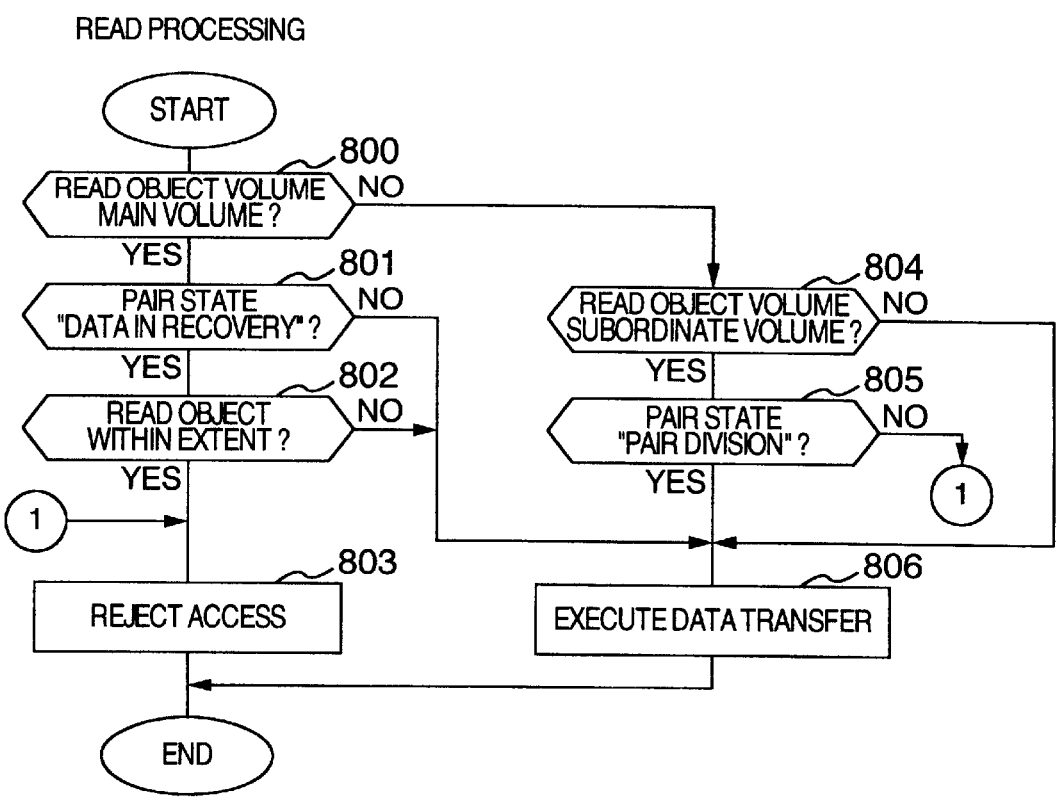
FIG. 8 is a flowchart showing a flow of read processing executed in step 516.

FIG. 8 shows in a flowchart a flow of read processing executed in step 516.

Host 101 issues a read request including, as parameters, an identifier and a track number of volume 108 from which data is to be read. The identifier and the track number of volume 108 specified by the parameters will be respectively represented as "RVOL" and "RTRK" herebelow.

In the read processing, disk subsystem 109 selects pair information 110 for which busy flag 200 is "busy" and main volume number 201 is "RVOL". If pertinent pair information 110 is present, processing goes to step 801; otherwise, processing goes to step 804 (step 800).

In step 801, disk subsystem 109 refers to pair state 204 of pair information 110 selected in step 800 to determine whether or not pair state 204 is "data in recovery". If pair state 204 is "data in recovery", processing goes to step 802; otherwise, processing proceeds to step 806.

In step 802, disk subsystem 109 determines whether or not track RTRK is included in an area identified by start address 207 and end address 208 of extent information 205. If track RTRK is included in the area, disk subsystem 109 reports rejection of an access to the area to host 101 and terminates the read processing (step 803). If track RTRK is beyond the area, the disk subsystem 109 reads by volume accessing section 107 data from track RTRK of volume 108 identified by identifier RVOL, transfers the data to host 101 to terminate, and then terminates the read processing (step 806).

When the read object volume is other than the main volume, disk subsystem 109 accesses pair information 110 for which busy flag 200 is "busy" to select therefrom pair information for which subordinate volume number 201 is "RVOL". If pertinent pair information 110 is absent, processing proceeds to step 806 in which data is transferred and the processing is terminated. If pertinent pair information 110 is present, processing proceeds to step 805 (step 804).

In step 805, disk subsystem 109 refers to pair state 204 of pair information 110 selected in step 804 to determine whether or not pair state 204 is "pair division". If pair state 204 is "pair division", processing goes to step 806 to transfer data. If pair state 204 is other than "pair division", processing goes to step 803 to reject an access to the area.

Figure 9:
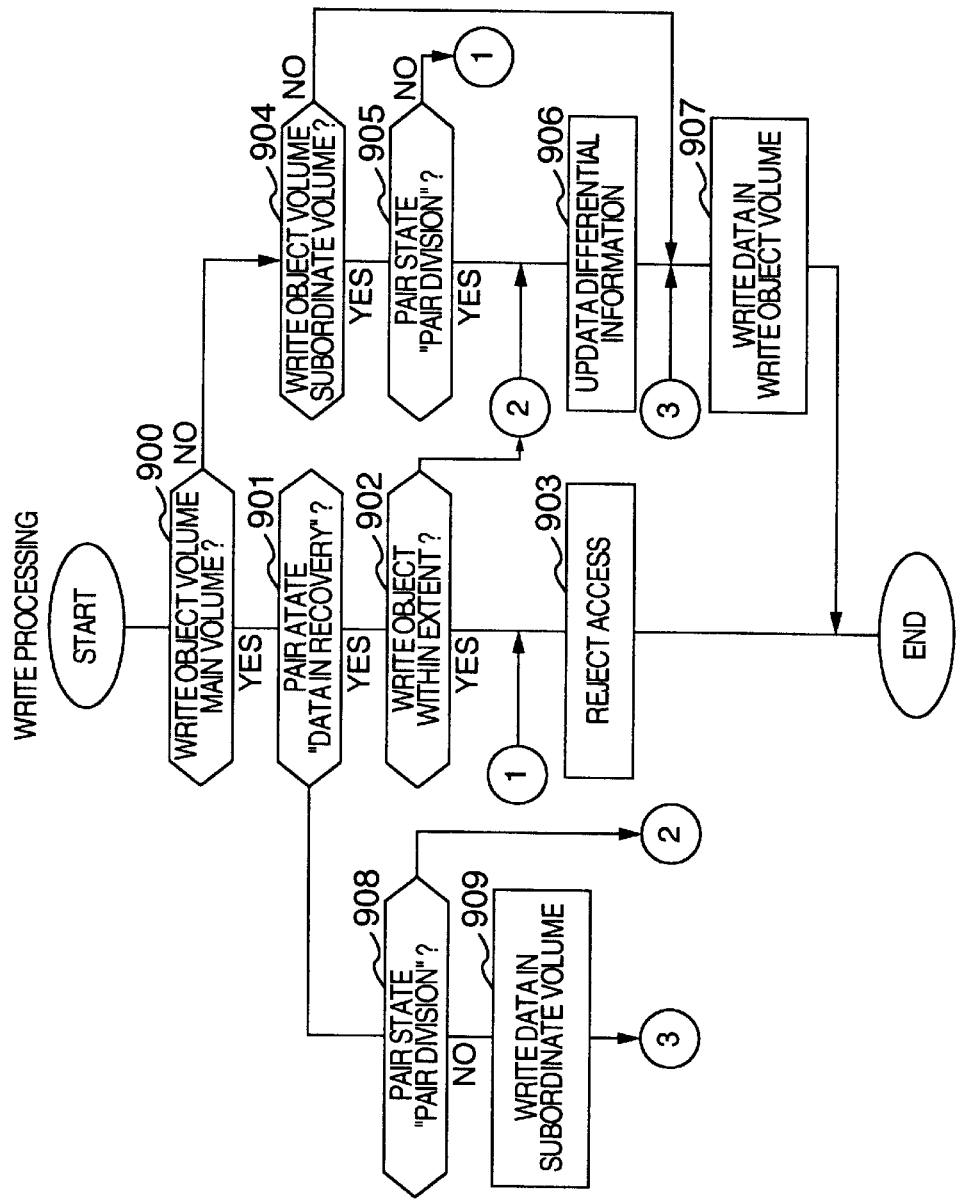
FIG. 9 is a flowchart showing a flow of write processing executed in step 517.

FIG. 9 shows in a flowchart a flow of write processing executed in step 517.

Host 101 issues a write request including parameters such as an identifier and a track number of volume 108 and write data. The identifier and the track number of volume 108 specified by the parameters will be respectively represented as "WVOL" and "WTRK" herebelow.

In the write processing, disk subsystem 109 selects pair information 110 for which busy flag 200 is "busy" and main volume number 201 is "WVOL". If pertinent pair information 110 is present, processing goes to step 901; otherwise, processing goes to step 904 (step 900).

In step 901, disk subsystem 109 refers to pair state 204 of pair information 110 selected in step 900 to determine whether or not pair state 204 is "data in recovery". If pair state 204 is "data in recovery", processing goes to step 902; otherwise, processing proceeds to step 908.

In step 908, disk subsystem 109 determines whether or not pair state 204 of pair information 110 selected in step 900 is "pair in division". If pair state 204 is "pair in division", disk subsystem 109 proceeds to step 906; otherwise, processing goes to step 909.

In step 909, disk subsystem 109 writes, by volume accessing section 107, the write data in track WTRK of volume 108 identified by subordinate volume number 202 of pair information 110 selected in step 900. Processing then goes to step 907.

In step 902, disk subsystem 109 determines whether or not track WTRK is included in an area identified by start address 207 and end address 208 of extent information 205 of pair information 110 selected in step 900. If track WTRK is included in the area, disk subsystem 109 goes to step 903; otherwise, processing goes to step 906.

In step 903, disk subsystem 109 reports rejection of an access to the area and then terminates the processing.

In step 904, disk subsystem 109 selects pair information 110 for which busy flag 200 is "busy" and subordinate volume number 201 is "WVOL". If pertinent pair information is present, processing proceeds to step 905; otherwise, processing goes to step 907.

In step 905, disk subsystem 109 determines whether or not pair state 204 of pair information selected in step 904 is "pair division". If pair state 204 is "pair division", processing goes to step 906; otherwise, processing goes to step 903.

In step 906, disk subsystem 109 sets "one" to difference (WTRK) of differential information 111 indicated by differential information number 203 of pair information 110 selected in step 904.

In step 907, disk subsystem 109 writes the received write data in track WTRK of volume 108 having an identifier of WVOL and terminates processing.

In the first embodiment above, disk subsystem 109 conducts processing in response to a request sent from host 101. Of such requests, a pair creation request, a pair division request, a pair deletion request, and a pair state referring request may be inputted from a remote terminal 100 to disk subsystem 109. In this situation, control processor 105 receives a request via a remote terminal interface 104 from remote terminal 100 to execute processing of the request. The processing is similar to that described above.

In the embodiment above, any read/write request to an area in which data is being recovered is rejected. However, by changing step 803 of the read processing and step 903 of the write processing, which will be described below, data may be transferred according to a read/write request for an area in data recovery.

Figure 10:
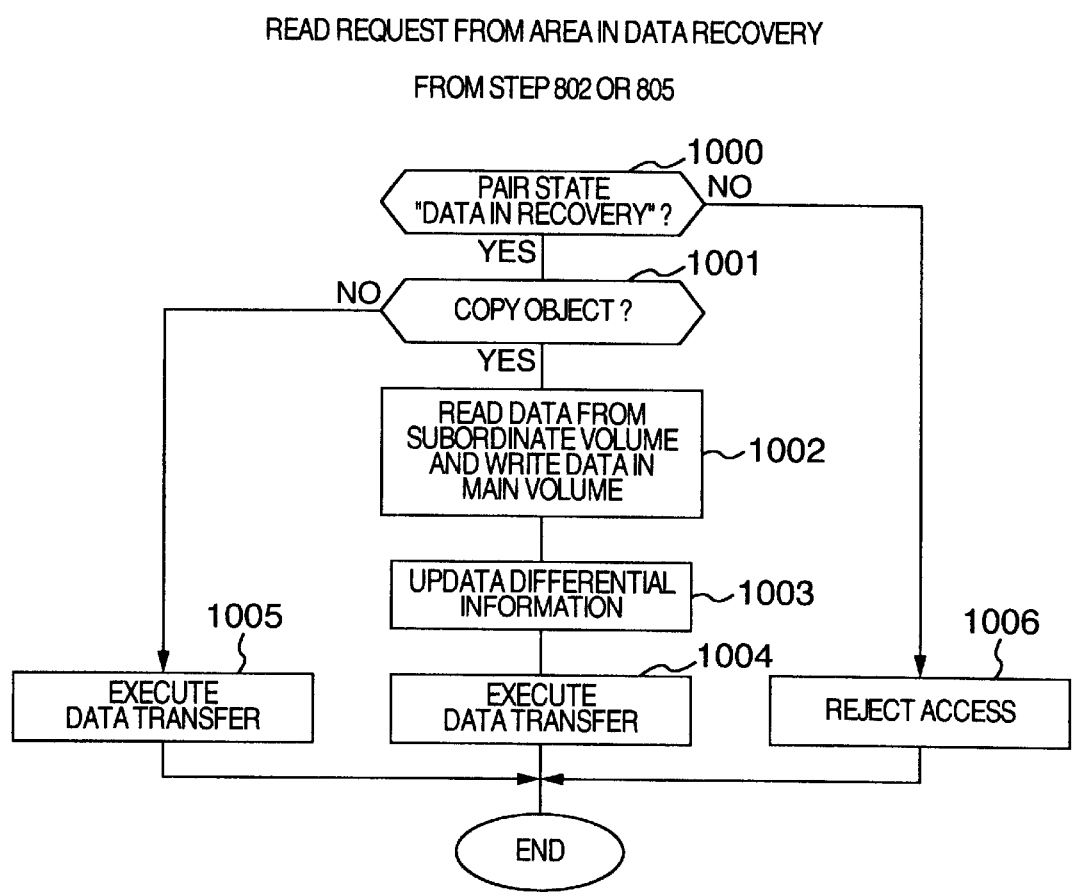
FIG. 10 is a flowchart showing a flow of processing executed in place of processing of step 803 to transfer data in response to a read request for an area in which data is being recovered.

FIG. 10 shows in a flowchart a flow of processing executed in place of step 803 to transfer data in response to a read request for an area in which data is being recovered.

In response to a read request for an area in data recovery, disk subsystem 109 refers to pair information 110 to determine whether or not pair state 204 of a pair of volumes including a volume for the read request is "data in recovery" (step 1000). If pair state 204 is "data in recovery", disk subsystem 109 determines whether or not the area for the read request is a copy object. Specifically, disk subsystem 109 determines whether copy object (RTRK) of differential information 111 indicated by differential information number 203 of pair information 110 is "0" or "1". If copy object (RTRK) is "0", disk subsystem 109 reads by volume accessing section 107 data from volume 108, transfers the data to host 101, and terminates processing (step 1005).

If it is determined that the area is a copy object in step 1001, subsystem 109 reads by volume accessing section 107 data from track RTRK of the subordinate volume and writes the data in track RTRK of the main volume (step 1002).

Disk subsystem 109 then sets "0" to copy object (RTRK; step 1003). Disk subsystem 109 reads by volume accessing section 107 data from volume 108, transfers the data to host 101, and terminates processing (step 1004).

When it is determined that pair state 204 is other than "data in recovery" in step 1000, disk subsystem 109 reports rejection of the access to area to host 101 and terminates processing (step 1006).

Figure 11:
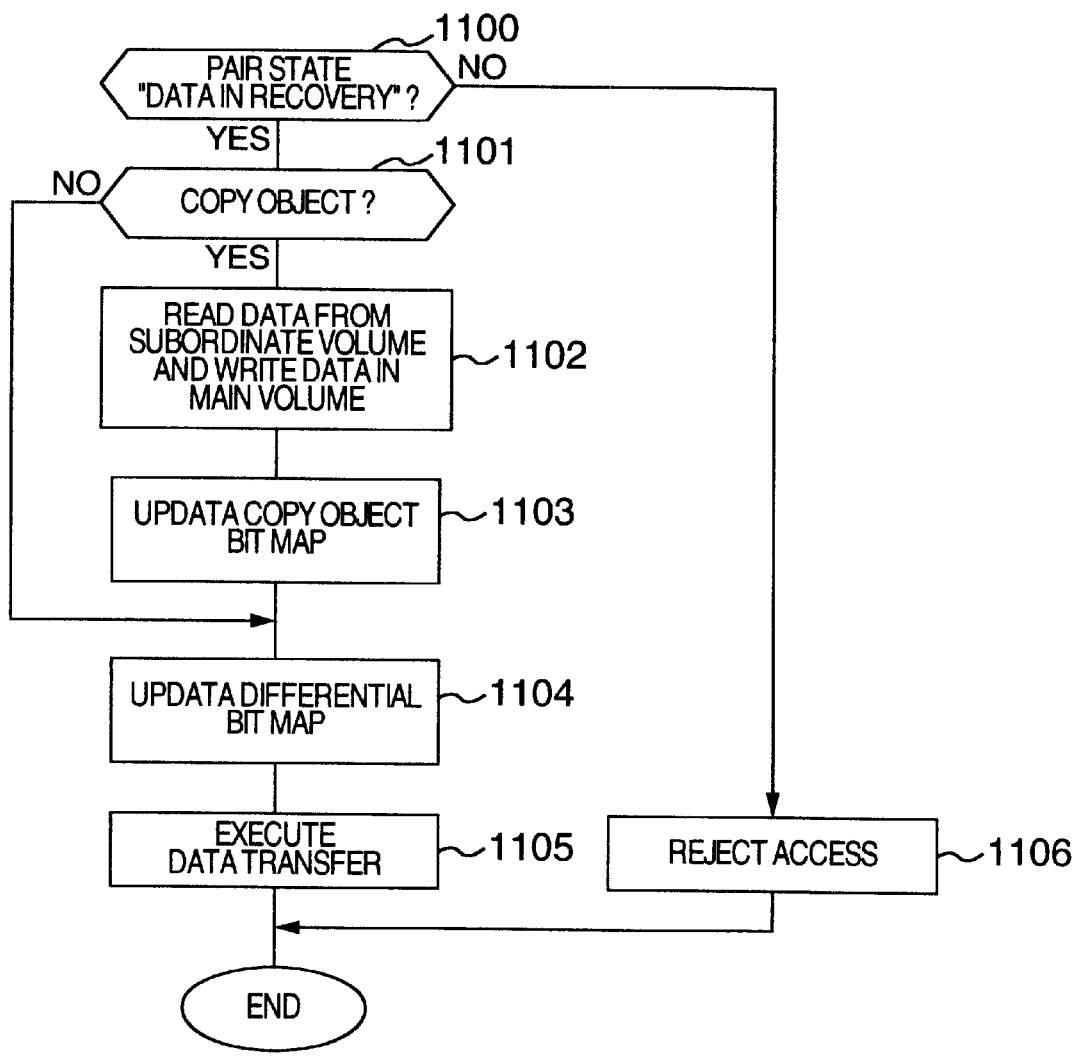
FIG. 11 is a flowchart showing a flow of processing executed in place of processing of step 903 to process a write request for an area in which data is being recovered.

FIG. 11 shows in a flowchart a flow of processing executed in place of step 903 to execute a write request for an area in which data is being recovered.

Having received a write request for an area in data recovery, disk subsystem 109 refers to pair information 110 related to a volume as an object of the write request and determines whether or not pair state 204 of the volume is "data in recovery" (step 1100).

If it is determined that pair state 204 is "data in recovery", disk subsystem 109 determines whether or not the area for the write request is a copy object. Specifically, disk subsystem 109 determines whether copy object (WTRK) of differential information 111 pointed by differential information number 203 of pair information is "0" or "1" (step 1101).

If copy object (WTRK) is "0", disk subsystem 109 goes to step 1104; if copy object (WTRK) is "1", processing goes to step 1102.

When it is determined in step 1101 that copy object (WTRK) is "1" and the area is a copy object, disk subsystem 109 reads by volume accessing section 107 data from track WTRK of the subordinate volume and writes the data in track WTRK of the main volume (step 1102). Disk subsystem 109 then sets "0" to copy object (WTRK) and goes to step 1104 (step 1103).

In step 1104, disk subsystem 109 sets "1" to difference (WTRK) of differential information. Disk subsystem 109 then writes by volume accessing section 107 the write data in track WTRK of volume 108 identified by identifier WVOL (step 1105).

When it is determined that pair state 204 is other than "data in recovery" in step 1100, disk subsystem 109 reports rejection of the access to area to host 101 and terminates processing (step 1106).

By the processing above, even in response to a read/write request for an area in which data is being recovered, read/write processing can be appropriately executed.

Description will be given of an alternative embodiment of an information processing in accordance with the present invention. The system of this embodiment is configured almost in the same way as for that shown in FIG. 1. However, this embodiment includes a function executed by control processor 105 different from that of FIG. 1. In this embodiment, the requests issued from host 101 or remote terminal 100 include; in addition to a pair creation request, a pair division request, a pair deletion request, a data recovery request, a pair state referring request, a read request, and a write request described above; a pair creation request without copy (FIG. 18C for FIG. 18A). Control processor 105 executes various processing for these requests.

Figure 12:
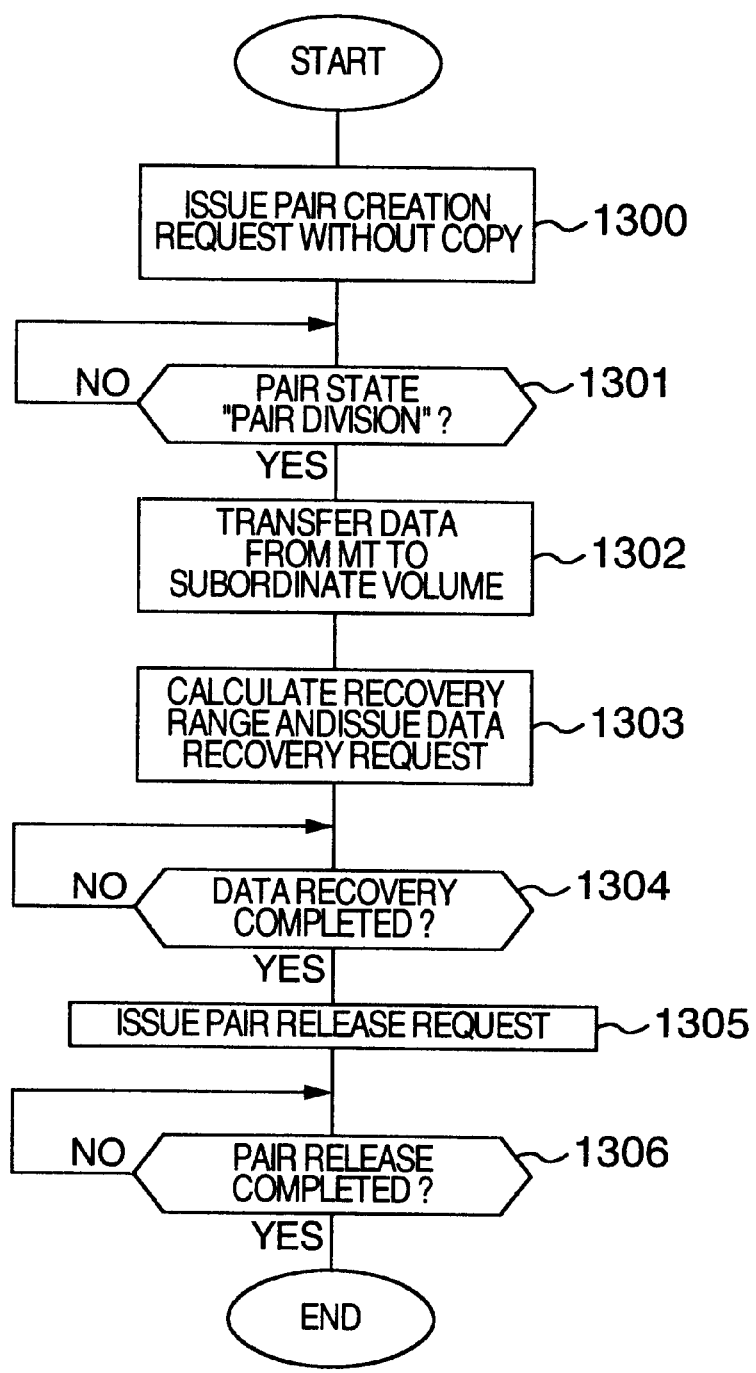
FIG. 12 is a flowchart showing a flow of processing on the side of host 101 in data recovery processing.

FIG. 12 is a flowchart showing operation on the side of host 101 for data recovery processing.

In data recovery processing, host 101 first issues a pair creation request without copy to disk subsystem 109. The request includes a main volume number and a subordinate volume number as parameters. An identifier of volume 108 to store data to be recovered is set to the main volume number and an identifier of an unused volume 108 to temporarily store data is set to the subordinate volume number. In the description below, the main volume as an object of processing has a volume number of S and the subordinate volume has a volume number of T (step 1300).

After having issued the pair creation request without copy, host 101 creates a pair state referring request including main volume number S and subordinate volume number T as parameters and issues the request to disk subsystem 109. In response to the request, if disk subsystem 109 sends a pair state other than "pair division", host 101 waits "pair division". After confirming that the pair state is "pair division", host 101 proceeds to subsequent processing (step 1301).

Host 101 then reads data from a magnetic tape (not shown) on which recovery data is stored for backup. Host 101 issues a write request to disk subsystem 1209 to write the data in volume 108 having volume number T (step 1302).

Backup data including the recovery data is written in volume 108, host 101 analyzes a log file to determine a range for data recovery. Host 101 then creates a data recovery request including, as parameters, main volume number S, subordinate volume number T, and a start address and an end address of the recovery range obtained and then issues the request to disk subsystem 109 (step 1303).

After issuance of the data recovery request, host 101 generates a pair state referring request including main volume number S and subordinate volume number T as parameters and issues the request to disk subsystem 109. In response thereto, if disk subsystem 109 reports a pair state other than "pair division", host 101 waits for "pair division". Having confirmed that the pair state is "pair division", host 101 proceeds to next processing (step 1304).

The processing above completes the data recovery. After the data is recovered, host 101 issues a pair release request including main volume number S and subordinate volume number T as parameters to disk subsystem 109 (step 1305).

After having issued the pair release request, host 101 issues a pair state referring request including main volume number S and subordinate volume number T as parameters to disk subsystem 109. In response thereto, if disk subsystem 109 reports a pair state other than "not in pair", host 101 waits for "not in pair". When the pair state becomes "not in pair" and the pair is released, host 101 terminates processing (step 1306).

In step 1300, when the pair creation request without copy is received from host 101, disk subsystem 109 executes processing as follows.

In response to the request from host 101, disk subsystem 109 selects pair information 110 for which busy flag 200 is "not busy" and sets busy flag 200 to "busy". Disk subsystem 109 then selects differential information 111 for which busy flag 301 is "not busy" and sets busy flag 301 to "busy".

Disk subsystem 109 sets "S" to main volume number 201 of pair information 110 selected, "T" to subordinate volume number 202 thereof, an identifier of selected differential information 111 to differential information number 203, and "pair division" to pair state 204 thereof. Disk subsystem 109 sets each bit of copy object bit map 302 of differential information 111 selected to "0" and each bit of differential bit map 303 thereof to "1".

Figure 13:
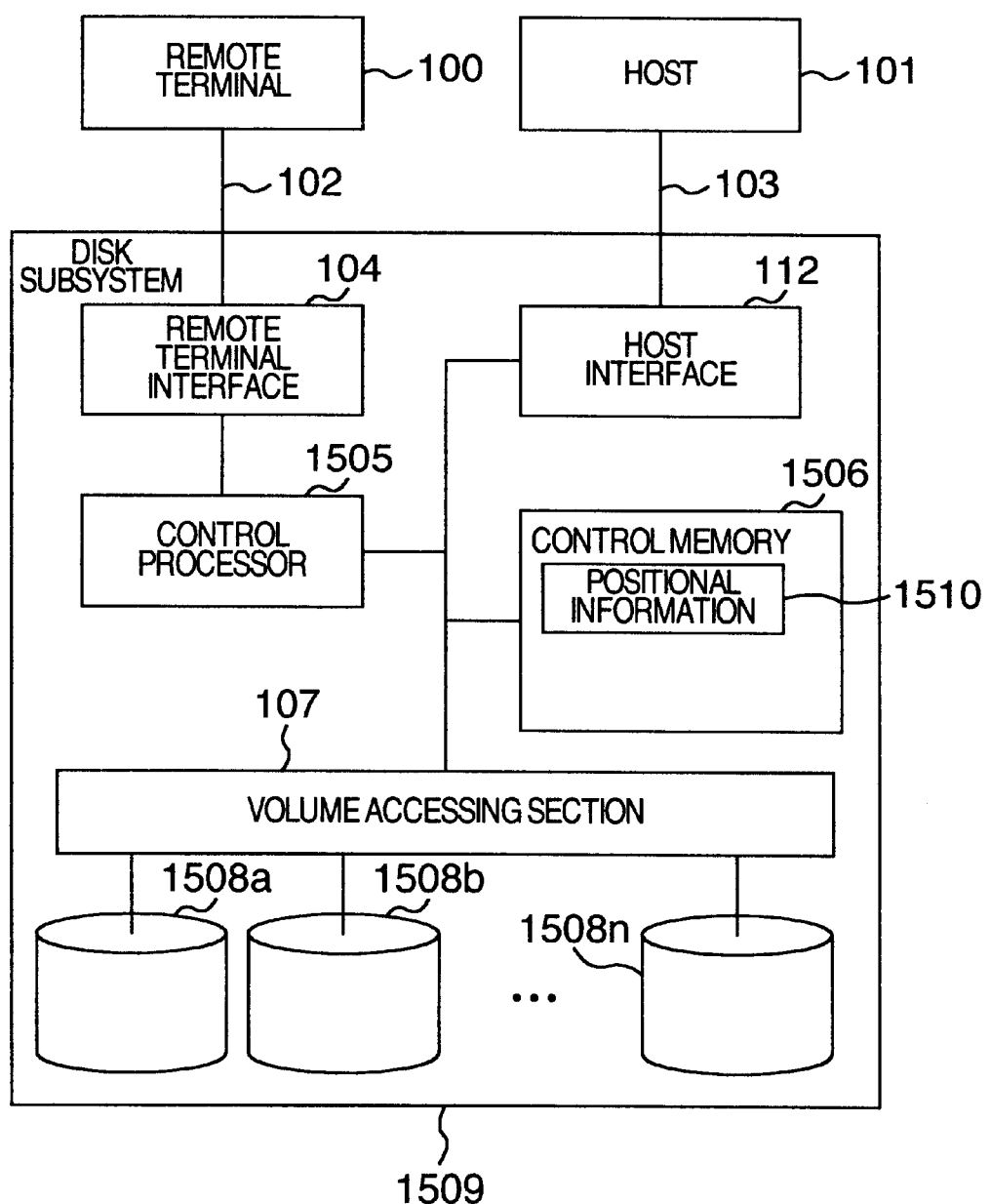
FIG. 13 is a block diagram showing a system configuration of another embodiment of an information processing system according to the present invention.

FIG. 13 shows in a block diagram a system configuration of an alternative embodiment of an information processing system in accordance with the present invention. This system is configured basically in the same fashion as for that shown in the first embodiment of FIG. 1. Functions of a control processor 1505, a control memory 1506, and the volume accessing section 107 are different from those of the embodiments described above. Description will be primarily given of the difference of this embodiment from the first embodiment.

Control memory 1506 stores positional information 1510 which is control information necessary for control processor 1505 to conduct control operations. Physical volumes 1508a to 1508n have a function to store data and volume accessing section 107 has a function to access volumes 1508a to 1508n.

In this embodiment, host 101 issues requests such as a read/write request to a logical volume virtually defined by disk subsystem 1509. In disk subsystem 1509, a plurality of logical volumes can be defined, and each logical volume has a unique identifier. The logical volumes are defined as follows.

(1) A logical volume includes a plurality of virtual logical tracks. A logical track is assigned with an identifier for discrimination thereof. The identifiers each have a value of a positive integer such as 0, 1, 2, and so on.

(2) A logical volume includes at least one virtual logical area. A logical area includes one or more continuous logical tracks. The number of tracks is fixed in each logical area. Each logical area is assigned with an identifier for discrimination thereof. The identifier is a positive integer (0, 1, 2, . . .).

Data on a physical volume is actually stored in logical volumes 1508a to 1508n. Physical volumes 1508a to 1508n has following features.

(1) Physical volumes 1508a to 1508n are configured with actual storages (such as a magnetic disk) to store data.

(2) Physical volumes 1508a to 1508n are configured with a plurality of physical tracks. Each track is assigned with an identifier for discrimination thereof. The identifier is a positive integer (0, 1, 2, . . . ).

(3) Physical volumes 1508a to 1508n are configured with a one or more physical areas. A physical area includes one or more continuous physical tracks. Each physical area includes an equal number of physical tracks. The number of physical track is same as the number of logical track constituting the logical area. Each physical track is assigned with an identifier for discrimination thereof. The identifier is a positive integer (0, 1, 2, ... ).

Figure 14:
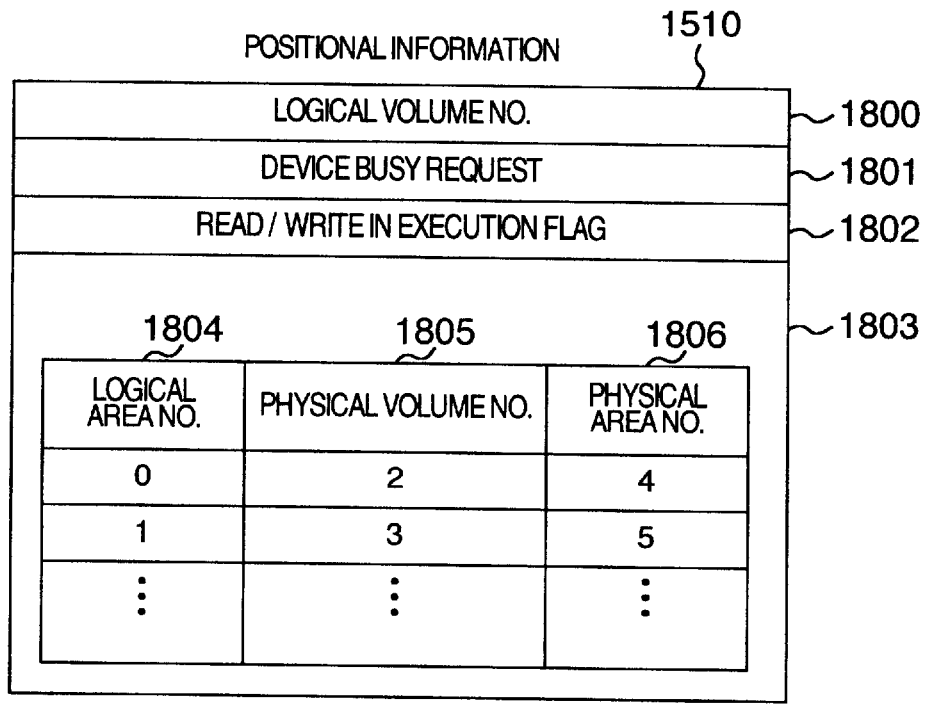
FIG. 14 is a diagram showing a data layout of positional information.

Control memory 1506 stores positional information 1510 which is mapping information to indicate a correspondence between logical volumes and physical volumes. FIG. 14 shows a data layout of positional information 1510. As can be seen from FIG. 14, positional information 1510 includes a logical volume number 1800, a device busy request 1801, a read/write in process flag 1802, and mapping information 1803.

Logical volume number 1800 indicates an identifier of a logical volume controlled by pertinent positional information 1510. Device busy request 1801 is information indicating that "device busy" is reported in response to an access from host 101 to a logical volume identified by logical volume number 1800. Device busy request 1801 takes a value of "on" or "off". Read/write in process flag 1802 is a flag indicating that a read/write request from host 101 is being executed for a logical volume identified by logical volume number 1800. Read/write in process flag 1802 takes a value of "on" or "off". Mapping information 1803 includes a logical area number 1804, a physical volume number 1805, and a physical area number 1806. Logical area number 1804 indicates an identifier assigned to a logical area in a logical volume. Physical volume number 1805 indicates an identifier of either one of physical volumes 1508a to 1508n. Physical area number 1806 is an identifier of a physical area in physical volume 108.

Figure 15:
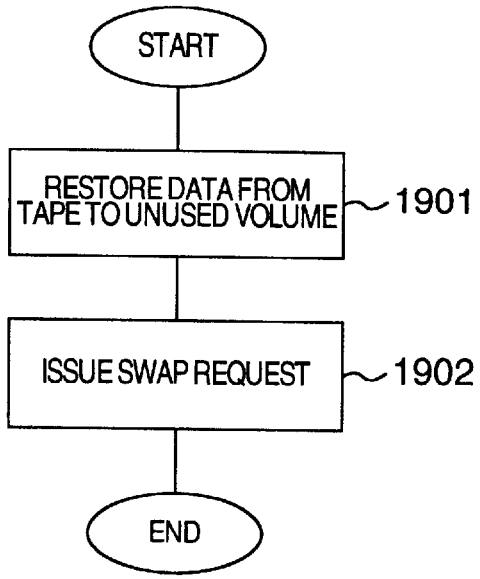
FIG. 15 is a flowchart showing a flow of processing executed on the side of host 101 in the data recovery processing.

FIG. 15 shows in a flowchart a flow of processing on the side of host 101 in the data recovery.

Description will be given of processing in which backup data stored on a magnetic tape is restored in logical volume 1600 having identifier S.

In the data recovery, host 101 selects one unused logical volume. Assume that this logical volume has identifier T. Host 101 reads backup data from a magnetic tape and restores a logical volume having identifier T using the data (step 1901).

After the restoration is completed, host 101 creates a swap request including main volume number S and subordinate volume number T as parameters and issues the request to disk subsystem 1509 (step 1902).

Figure 16:
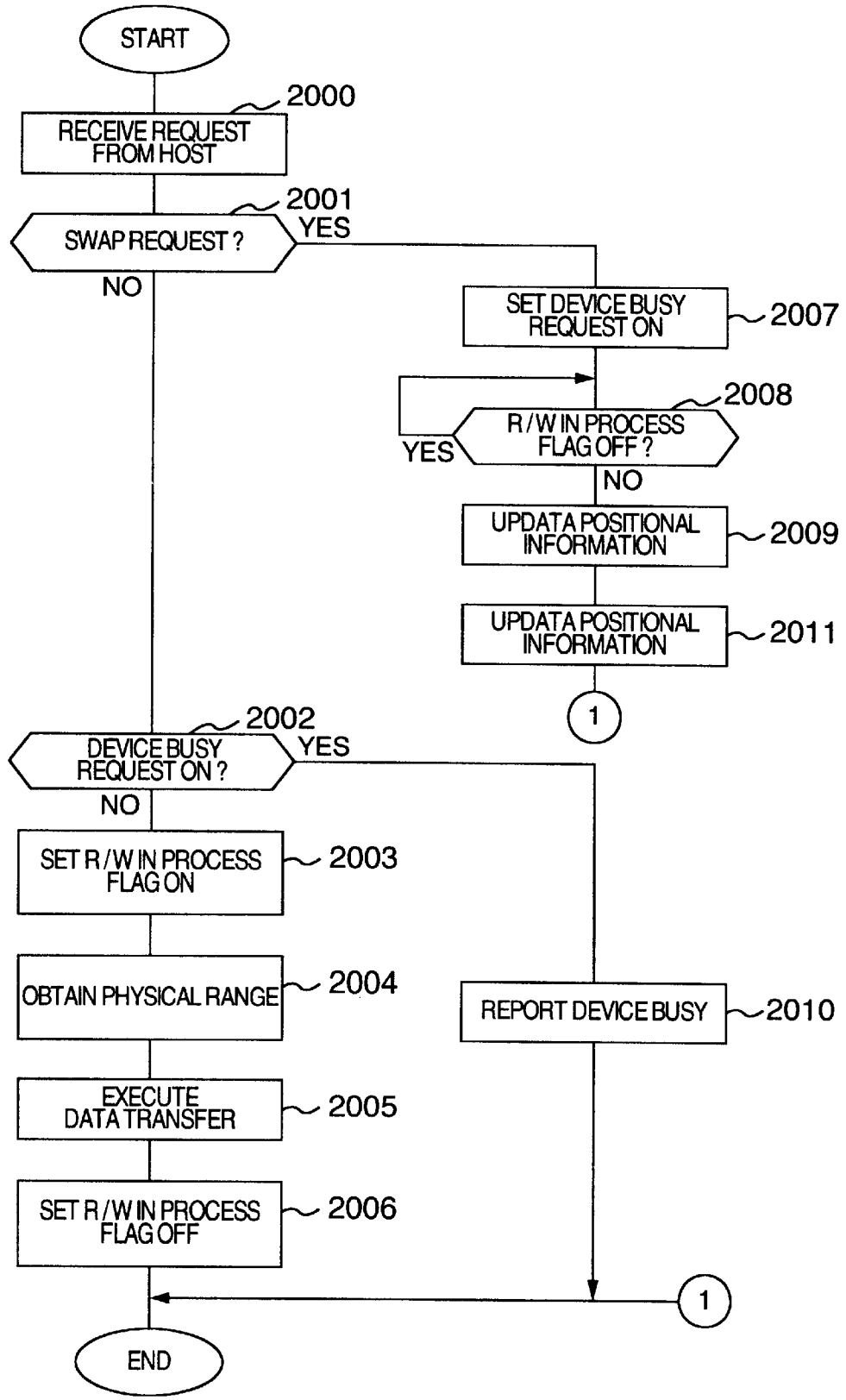
FIG. 16 is a flowchart showing a flow of processing in a disk subsystem 1509.
Figure 17A:
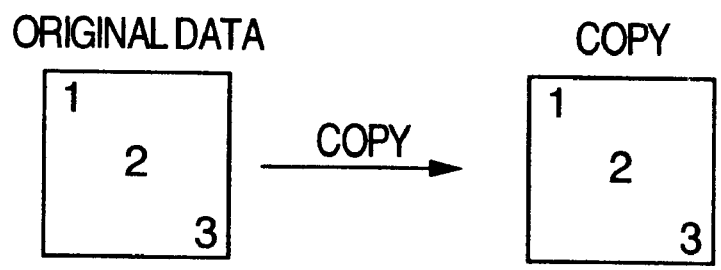
FIGS. 17A and 17B are diagrams showing relationships between original data and copy data in the backup and restoration operation.
Figure 17B:
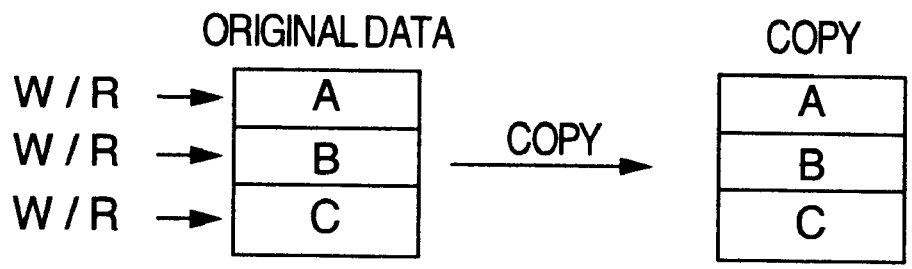

FIG. 16 is a flowchart showing processing of disk subsystem 1509 in the data recovery.

Having received a request from host 101 (step 2000), disk subsystem 1509 determines whether the request is a swap request or a read/write request (step 2001).

If the request received is a swap request, disk subsystem 1509 selects positional information 1510 having logical volume number 1800 equal to the main volume number specified by the parameter. Positional information 1510 above will be expressed as positional information (S) herebelow. Disk subsystem 1509 sets device busy request 1801 of positional information (S) to "on". Disk subsystem 1509 then selects positional information 1510 having logical volume number 1800 equal to the subordinate volume number specified by the parameter. Positional information 1510 above will be expressed as positional information (T) herebelow. Disk subsystem 1509 sets device busy request 1801 of positional information (T) to "on" (step 2007).

After having set device busy request 1801 to "on", disk subsystem 1509 determines whether or not read/write in process flag 1802 of positional information (S) and read/write in process flag 1802 of positional information (T) are "off" (step 2008).

If either read/write in process flag 1802 of positional information (S) or positional information (T) is other than "off", disk subsystem 1509 waits for "off". When both flags 1802 become "off", disk subsystem 1509 updates mapping information 1803. Specifically, values of mapping information 1803 of positional information (S) are interchanged with those of mapping information 1803 of positional information (T) (step 2009).

After interchange of mapping information 1803 is completed, disk subsystem 1509 sets "off" to device busy request 1801 of positional information (S) and device busy request 1801 of positional information (T) and then terminates processing (step 2011).

If it is determined that the request received from host 101 in step 2001 is a read/write request, disk subsystem 1509 selects positional information 1510 of which logical volume number 1800 is an identifier of logical volume as an object of the read/write request.

Disk subsystem 1509 determines whether or not device busy request 1801 has a value of "on". If the value is "on", disk subsystem 1509 reports "device busy" to host 101 and terminates processing (step 2010).

If the value is other than "on", disk subsystem 1509 sets "on" to read/write in process flag 1802 of positional information (S) and read/write in process flag 1802 of positional information (T) (step 2003).

After read/write in process flag 1802 is completely updated, disk subsystem 1509 obtains a physical track corresponding to a logical track as an object of the read/write request. The physical track is attained using the values of mapping information 1803 of positional information (S) as follows.

(1) the value of the identifier of the logical track for the read/write request is divided by the number of logical tracks of a logical area. Assume that a quotient and a remainder of the division are A and B, respectively.

(2) In a row in which logical area number 1804 is A in mapping information 1803, value C is obtained in a field of physical volume number 1805.

(3) In a row in which logical area number 1804 is A in mapping information 1803, value D is attained in a field of physical area number 1806.

(4) Value D is multiplied by the number of physical tracks of a physical area to obtain product E.

(5) E is added to B to attain F as a result.

According to F, the physical track for the read/write request is a physical track having identifier F in physical volume 108 having identifier C (step 2004).

After the physical track is determined, disk subsystem 1509 executes by volume accessing section 107 a data transfer to host 101 (step 2005).

When the data transfer is completed, disk subsystem 1509 sets "off" to read/write in process flag 1802 of positional information (S) and read/write in process flag 1802 of positional information (T) and terminates processing (step 2006).

In the description above, all data of the logical volume is interchanged. However, it is also possible that data in a logical area of a first logical volume is interchanged with data in a logical area of a second logical volume. Description will be next given of a data interchange in which data in logical area S1 of a logical volume having identifier S is interchanged with data in logical area T1 of a logical volume having identifier T.

In the operation, host 101 issues a data interchange request including parameters S, S1, T, and T1 to disk subsystem 1509.

Having received the request, disk subsystem 1509 sets, as in the processing executed in response to reception of a swap request, "on" to device busy request 1801 and waits for "off" of read/write in process flag 1802. When flag 1802 becomes "off", disk subsystem 1509 interchanges values of logical volume number 1805 and physical area number 1806 corresponding to an entry for which logical area number 1804 is S1 in mapping information 1803 included in positional information 1510 whose logical volume number 1800 is S with values of logical volume number 1805 and physical area number 1806 corresponding to an entry for which logical area number 1804 is T in mapping information 1803 associated with positional information 1510 whose logical volume number 1800 is T. When the interchange is completed, disk subsystem 1509 set "off" to device busy request 1801 and terminates processing.

In the description of the embodiments above, disk devices are used as examples of storages. However, it is naturally possible to use a backup magnetic tape and the like.

In accordance with the embodiments above, when data of a storage subsystem is recovered at occurrence of a failure during execution of processing by the host, the data can be recovered in a short period of time without imposing any heavy load on the host.

While the present invention has been described in detail and pictorially in the accompanying drawings, it is not limited to such details since many changes and modifications recognizable to those of ordinary skill in the art may be made to the invention without departing from the spirit and scope thereof.

What is claimed is:

1. In an information processing system including a computer for generating commands to process data stored in a storage medium and a storage system connected to said computer, said storage system including a plurality of volumes and a controller for controlling said storage system according to a command received from said computer, a data recovery method of recovering data to a predetermined state at occurrence of a failure in a sequence of processing executed by said computer, said data recovery method comprising the steps of:

issuing, to said storage system before a sequence of processing is executed by said computer, a saving request to save a copy of data stored in a first volume of said plurality of volumes, said data is used in the sequence of processing, in a second volume of said plurality of volumes;

saving by said storage system, in response to the saving request, a copy of data of said first volume into said second volume;

setting and storing by said storage system, when partial data stored in said first volume are updated, differential information designating one or a plurality of first storage areas in said first volume, in which the updated data are stored, and one or a plurality of second storage areas in said second volume, each of which corresponding to each of said one or a plurality of first storage areas;

issuing, when it is necessary to recover data stored in said first volume to a state of a predetermined point, a data recovery request including location information designating a partial area of said second volume to said storage system; and storing, by said storage system in response to the data recovery request, the copy of data stored in said partial area of said second volume into one or a plurality of corresponding storage areas in said first volume according to said differential information.

2. A data recovery method according to claim 1, wherein said storage system further includes said a plurality of disks.

3. A data recovery method according to claim 1, wherein said saving request and said data recovery request are issued from a control terminal connected to said storage system.

4. A data recovery method according to claim 1, wherein said step of saving a copy of data includes:

storing data equal to data stored in said first volume in said second volume.

5. A data recovery method according to claim 4, wherein said step of saving a copy of data includes:

assigning one of said plurality of volumes that is not utilized as said second volume; and copying data from said first volume to said second volume.

6. A data recovery method according to claim 1, wherein said step of storing copy of data is conducted for one or a plurality of storage areas designated by both said differential information and said location information.

7. A storage system coupled to a computer, comprising:

a plurality of volumes;

means for storing a copy of data stored in a first volume of said plurality of volumes into a second volume of said plurality of volumes, in response to a command from said computer, before a sequence of processing is executed by said computer;

means for updating, in response to a data update request from said computer, partial data stored in said first volume;

means for generating differential information for identifying one or a plurality of first storage areas in said first volume in which the updated data is stored, and one or a plurality of second storage areas in said second volume, each of which corresponding to each of said one or a plurality of first storage areas;

means for receiving a data recovery request from said computer, said data recovery request including location information designating a partial area of said second volume; and means for replacing updated data stored in a partial area of said first volume with data saved in said partial area of said second volume, according to the differential information, in response to said data recovery request.

8. A storage system according to claim 7, wherein said plurality of volumes are included in a plurality of disks.

9. In an information processing system including a host computer and a storage system connected to said host computer, said storage system including a plurality of physical volumes and a controller for controlling said storage system according to a command received from said host computer, a data recovery method of recovering data stored in a logical volume accessed by said host computer upon occurrence of a failure in a sequence of processing executed by said host computer, said data recovery method comprising the steps of:

saving backup data of said logical volume to a storage medium;

after saving backup data, updating data stored in said logical volume according to a command received from said host computer, wherein data of said logical volume physically stored in one or a plurality of first physical volumes corresponding to said logical volume;

controlling, by said host computer, to store said backup data stored in said storage medium into one or plurality of second physical volumes;

relating by said controller, said logical volume to said one or a plurality of second physical volumes in response to a swap request from said host computer; and after relating said logical volume to said one or a plurality of second physical volumes, accessing by said controller, data in said one or a plurality of second physical volumes said in response to an access request from said host computer to said logical volume.

10. A data recovery method according to claim 9, wherein said storage system includes a plurality of disks.

11. A storage system coupled to a host computer, comprising:

a controller for controlling said storage system according to a command received from said host computer;

a plurality of volumes; and a host interface coupled to said host computer, wherein said controller controls copying of data of a first volume and storing the copy of the data into a second volume according to a request received by said host interface, after storing the copy of the data, said controller controls storing a write data received from said host computer into the first volume updating differential information designating a first storage area in first volume, in which said write data is stored, and a second storage area in the second volume corresponding to said first storage area, said host interface receives a recovery request, from said host computer, for recovering the data stored in the first volume to a predetermined state, said recovery request includes storage area information designating a partial storage area of said second volume in which data used for recovering is stored, and said controller controls copying of data stored in said partial area of said second volume to a corresponding storage area in the first volume according to said differential information.

12. An information processing system, comprising:

a host computer sending a command to a storage system to execute a sequential processing unit data stored in said storage system; and a storage system coupled to said host computer, said storage system including a plurality of volumes and a controller for controlling said storage system according to a command received from said host computer, wherein said host computer sends a saving request to said storage system to save data stored in one or a plurality of first volumes into one or a plurality of second volumes, before said host computer executes a sequential processing, said controller controls copying of a data of said one or plurality of first volumes into said one or a plurality of second volumes according to said saving request, said controller controls storing of a write data received from said host computer into said one or a plurality of first volumes, while said host computer executes said sequential processing, said controller sets a differential information designating a first storage area in said one or a plurality of first volumes, in which said write data is stored, and a second storage area in said one or a plurality of second volumes corresponding to said first storage area, said host computer sends a recovery request to said storage system, when a failure in said sequential processing occurs, said recovery request including storage area information designating a partial storage area of said one or a plurality of second volumes in which data used for recovering is stored, and said controller controls copying of data stored in said partial storage area of said one or a plurality of second volumes designated by said storage area information to a corresponding storage area in said one or a plurality of first volumes according to said differential information.

* * * * *